Oct. 16, 1934. H. R. TEAR 1,976,903
LUBRICATING DEVICE
Filed March 6, 1933 4 Sheets-Sheet 1
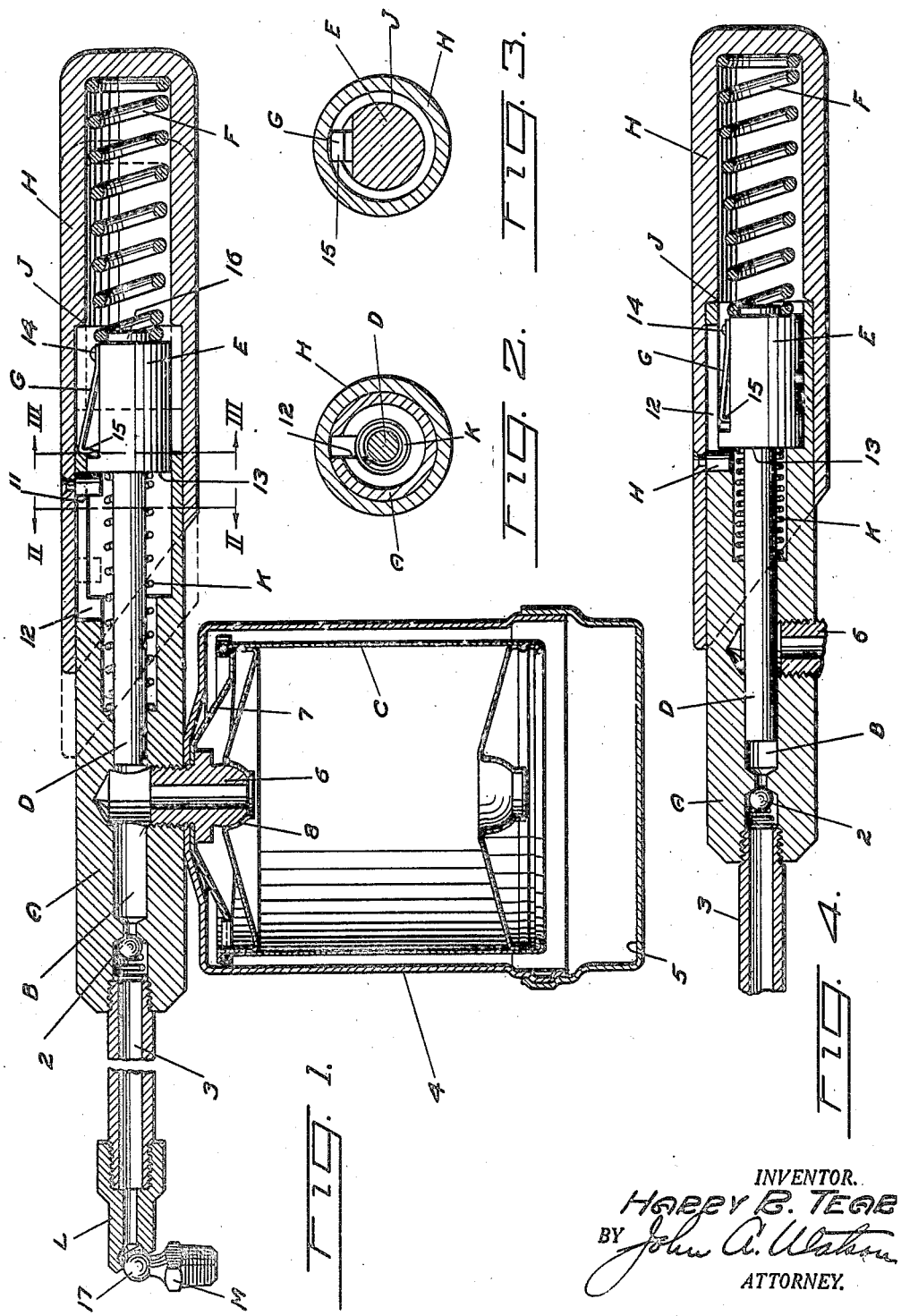
INVENTOR.
HARRY R. TEAR
BY John A. Watson
ATTORNEY.

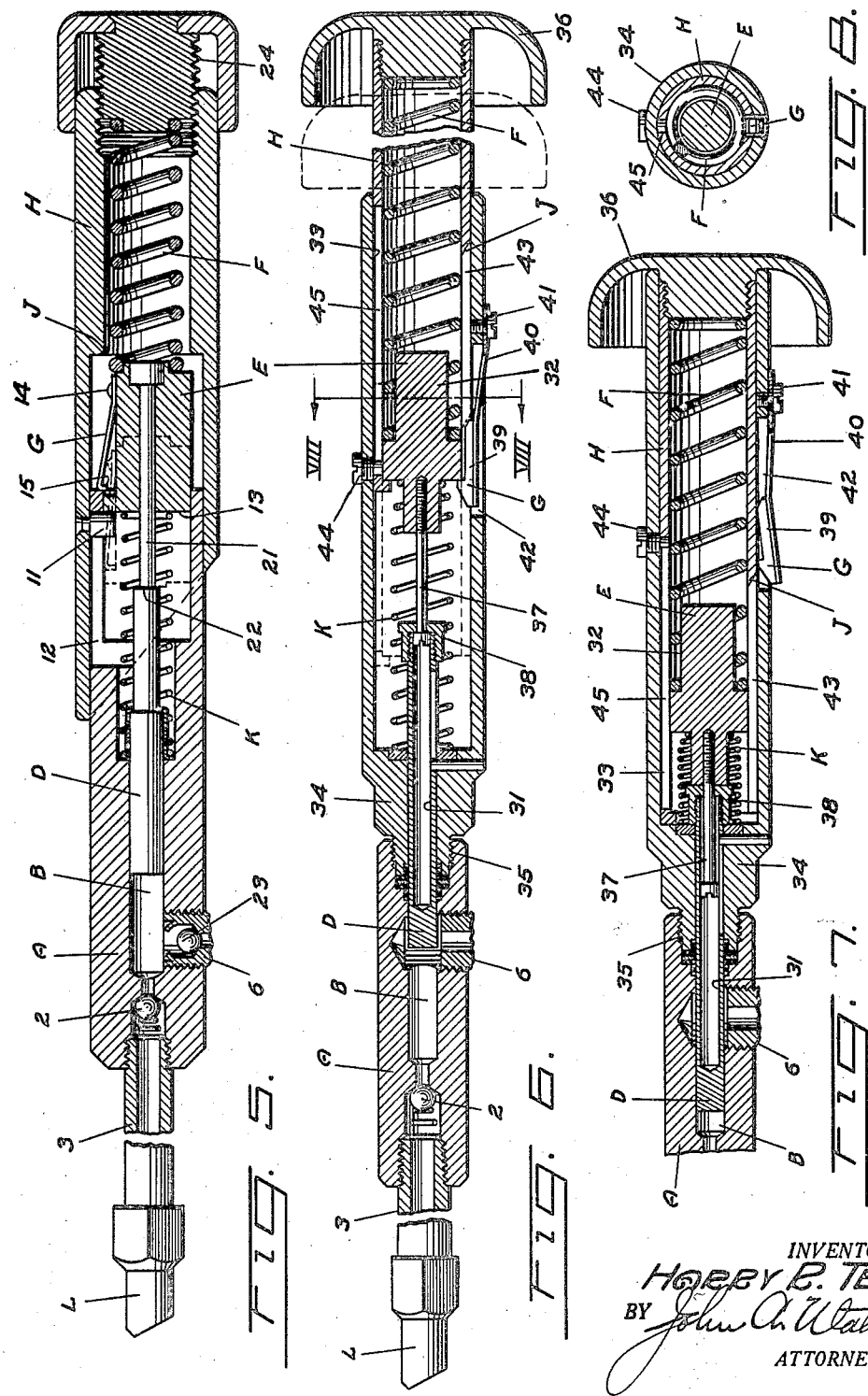

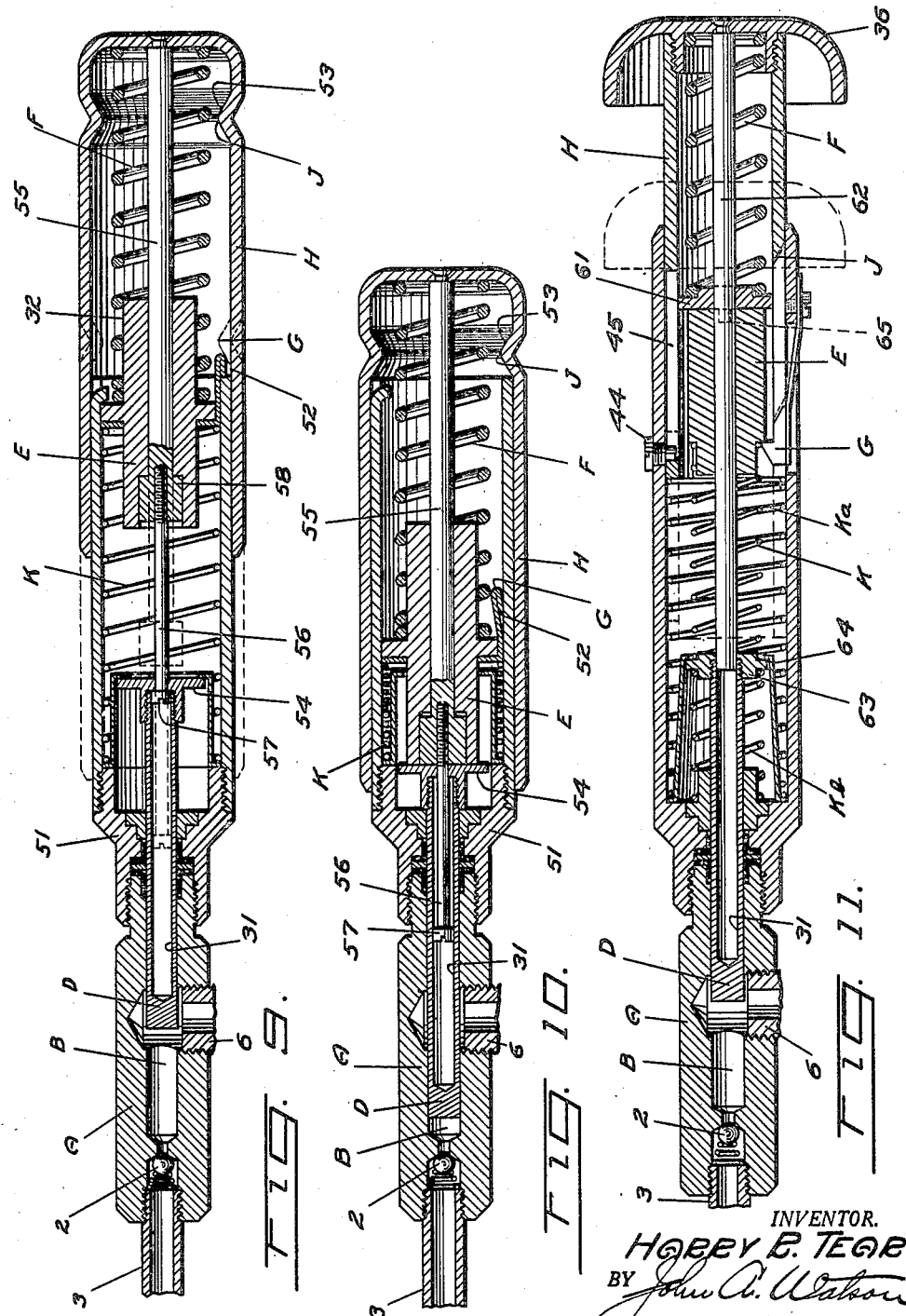

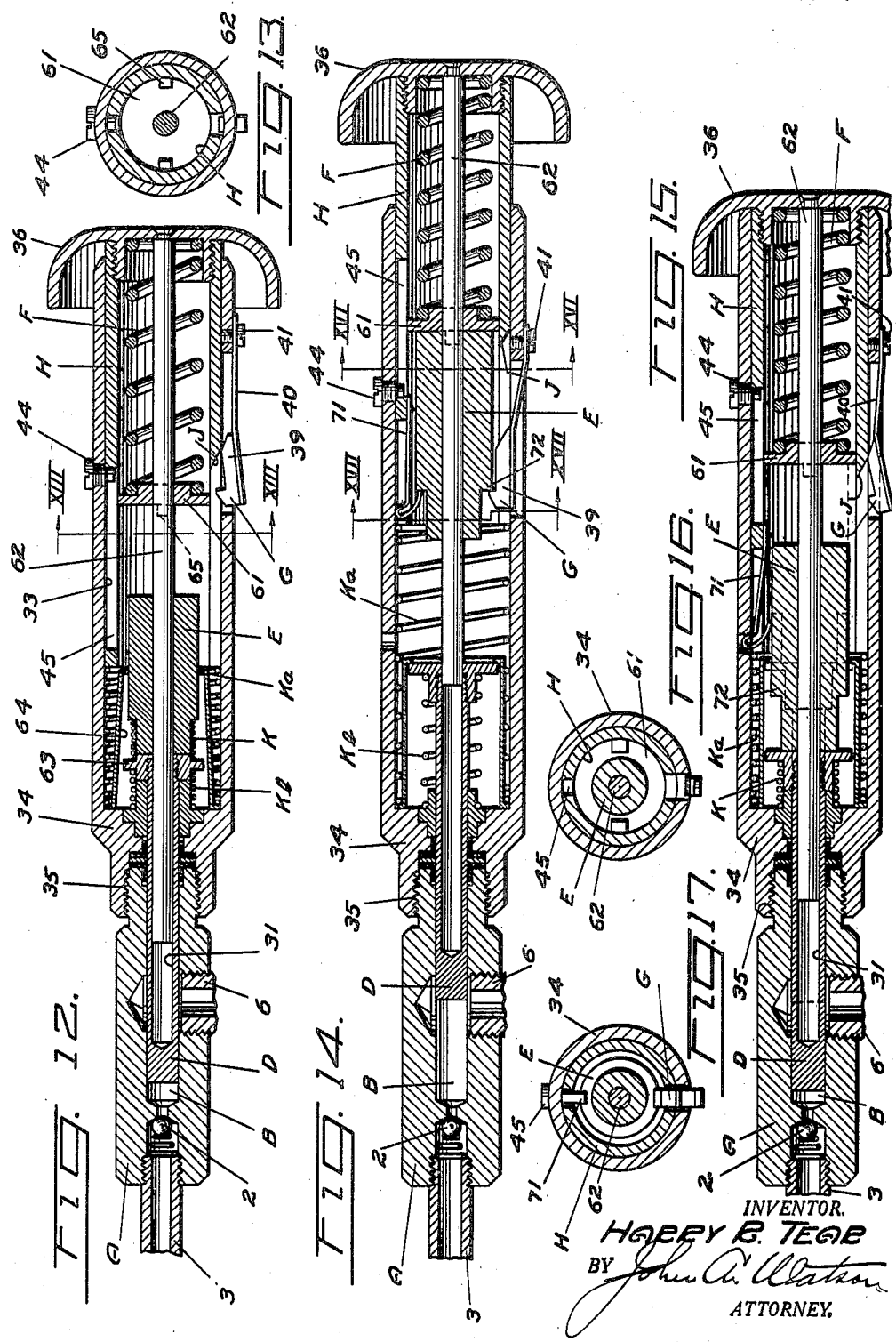

Patented Oct. 16, 1934

1,976,903

UNITED STATES PATENT OFFICE 1,976,903

LUBRICATING DEVICE

Harry E. Tear, South Bend, Ind., assignor to The Lubrication Corporation, South Bend, Ind., a corporation of Delaware Application March 6, 1933, Serial No. 659,640

20 Claims. (Cl. 221—47.4)

This invention relates to improvements in lubricating devices and more particularly to high pressure lubricant guns.

An object of the invention is to provide a hand lubricant gun, for use with a contact nozzle of the type adapted to provide an annular contact sealing engagement with a lubricant receiving fitting, wherein greater pressure may be developed than may be developed in high pressure hand guns of the type now in use without breaking the lubricant seal between the nozzle of the gun and the fitting.

Another object is to provide a high pressure lubricant gun wherein kinetic energy is built up during each operative cycle and utilized to drive the high pressure piston by direct thrust or impact.

Another object is to provide a high pressure lubricant gun, of the impact type, incorporating automatic means for returning the hammer at the end of a power stroke with minimum power absorption during the impact stroke of the hammer.

A further object is to provide a gun of the character described which is relatively compact and light in weight with respect to the lubricant pressure developed.

Other objects, advantages and uses of the invention, will be apparent after reading the following description and claims and after consideration of the accompanying drawings forming a part of this specification, in which:

Fig. 1 is a sectional view illustrating a complete hand lubricant gun constructed in accordance with the invention;

Fig. 2 is a sectional view along the line II—II of Fig. 1;

Fig. 3 is a sectional view along the line III—III of Fig. 1;

Fig. 4 is a sectional view of the gun mechanism of Fig. 1 at the termination of a pressure stroke;

Fig. 5 is a sectional view of a modified form of the gun mechanism of Fig. 1;

Figs. 6 and 7 are sectional views of another form of the gun mechanism with the elements in normal position and at the end of a power stroke, respectively;

Fig. 8 is a sectional view along the line VIII—VIII of Fig. 6;

Figs. 9 and 10 are views similar to Figs. 6 and 7, respectively, of another form of the gun mechanism;

Figs. 11 and 12 are views similar to Figs. 6 and 7, respectively, of a further form of the gun mechanism;

Fig. 13 is a sectional view along the line XIII—XIII of Fig. 12;

Figs. 14 and 15 are views similar to Figs. 6 and 7, respectively, of a further embodiment of the gun mechanism;

Fig. 16 is a sectional view along the line XVI—XVI of Fig. 14; and

Fig. 17 is a sectional view along the line XVII—XVII of Fig. 14.

The several lubricant guns illustrated herein are of the type intended to be held in, and operated by, the hand of the user. In general they comprise a body member A providing a high pressure cylinder B, a source of lubricant supply, such as a cartridge C, communicating with the cylinder B, a high pressure plunger D in the cylinder B, a hammer E for driving impact with the plunger D, a compression spring F for operating the hammer E, latch mechanism G for locking the hammer during compression of the spring F, a manually operable sleeve H for compressing the spring, releasing means J for releasing the latch G, and a compression spring K for returning the hammer E to its normal position. The gun further includes a discharge nozzle L of the contact type adapted for sealing engagement with the head of a lubricant receiving fitting M.

Referring to Figs. 1 to 4, inclusive, of the drawings, the cylinder B may be provided with an outlet check valve 2 located between the cylinder and a discharge conduit 3 rigidly supported upon the body A at the outer end of which is mounted the discharge nozzle L. The lubricant cartridge C comprising the source of lubricant supply, may be housed within a casing 4 secured to the body A of the gun and provided with a removable cap 5. Communication between the cartridge C and the cylinder B may be established through the medium of a cartridge connector stud 6 extending through the side wall of the body A and into the casing 4. A cartridge connector plate 7 mounted within the casing may be employed for holding the cartridge C in place, with the walls 8 of its outlet opening, drawn into engagement tightly with the external walls of the stud 6 to form a lubricant tight seal therewith. Obviously the source of lubricant supply may comprise other suitable means such, for instance, as a lubricant reservoir into which lubricant may be transferred in bulk, or a remote low pressure lubricant dispenser coupled to the gun by flexible hose communicating with the cylinder B.

In the gun of Figs. 1 to 4, the high pressure plunger D and the hammer E are formed integrally, the hammer E possessing relatively large mass (and therefore large inertia) compared with the plunger D. The travel of the operating sleeve H longitudinally of the body A may be limited by the provision of a pin 11 extending inwardly of the sleeve and within a slot 12 formed through the wall of the rearward portion of the body. The pin 11, projecting through the slot 12, prevents rotation of the sleeve H, and also is arranged to overhang the forward surface 13 of the hammer E to limit the extension of spring F and thus to permit its being placed under an initial compression. The latch G may be formed of strip spring steel and is secured at 14 to the side wall of the hammer E at its rearward end. Its outer end 15 is turned inwardly to provide a surface perpendicular to the axis of the hammer which, when the gun parts are in their normal position, is arranged to bear upon the rearward end surface of the body A to lock the hammer and plunger against forward movement toward the cylinder B. The power compression spring F is located within the rearward end of the sleeve H and bears, at its forward end, directly upon the adjacent end of the hammer E. A small boss 16 is centrally located upon the end wall of the hammer to concentrically locate the adjacent end of the spring F with respect to the axis of the aligned hammer and plunger. The releasing means J comprises a shoulder formed within the bore of the sleeve H for engaging with the latch G to urge it toward the hammer E when the sleeve H is moved to the position shown in dotted lines of Fig. 1, as to compress the spring F.

In operation the gun may be held in the hand of the operator by manually grasping the outer walls of the sleeve H. When held in this manner the operator may direct the nozzle L upon the head 17 of the lubricant receiving fitting M so as to provide an annular sealing engagement therewith, as illustrated in Fig. 1. Manual thrust upon the sleeve H may thereupon place the spring F under compression, thus transferring thrust to the nozzle L in proportion of the pressure applied, at the same time compressing the spring F and storing therein potential energy, later to be transferred to the hammer E. When the sleeve H has been thrust to the position shown in dotted lines in Fig. 1 the releasing shoulder J will contact with the latch G to urge the latch inwardly until it no longer engages with the rearward end of the body A. At this moment the potential energy stored in the compression spring F will be released and applied as a driving force to propel the hammer E and the plunger D forwardly.

During the first portion of its forward stroke the plunger D merely displaces lubricant, forcing it to flow back into the cartridge C. Since the passage is large and the lubricant in the cartridge is subjected to atmospheric pressure only, this is accomplished with little effort, and the major part of the pressure of the spring F is therefore available to accelerate the hammer E and plunger D. By the time the forward end of the plunger reaches and enters the cylinder B, the hammer and plunger have acquired relatively high velocity, and hence relatively high momentum, much of the potential energy of the spring having been transformed into kinetic energy of the moving mass of the hammer and plunger.

At this instant, the lubricant in cylinder B is trapped by the plunger D, and can only escape through the outlet check valve 2, discharge conduit 3, and nozzle L into the fitting M. Owing to the resistance to flow offered by the check valve and the lubricant passages, such flow can take place only when the lubricant is put under pressure by the plunger D, which is acted on by two forces, the pressure of the spring F and the inertia or momentum of the hammer E. Unless the resistance to flow is extremely small, in which case the plunger is not slowed down and the spring F alone furnishes the entire pressure-producing force, the lubricant in the cylinder B offers sufficient resistance to check the speed of the rapidly moving plunger, and if the resistance is great enough the plunger will be brought to rest before it completes its stroke. The force developed in overcoming the inertia of the mass of the plunger and hammer and bringing them to a complete stop, is exerted upon the lubricant in the cylinder B, thereby creating relatively high pressure therein. In other words, the entire kinetic energy of the moving mass is utilized to produce pressure on the lubricant. The greater the resistance offered by the grease, the more rapidly the speed of the moving masses is checked and hence the greater the resulting pressure. In other words, this lubricant gun has the unique property of tending to develop just sufficient pressure to overcome the resistance to lubricant flow, whatever, it may be, within the limits of its capacity.

During the power stroke, the spring K will become compressed, as may be seen in Fig. 4, thus absorbing a part of the energy stored in the spring F, which is later utilized to return the plunger D, hammer E and sleeve H to their normal positions. The spring K has only to overcome the friction of these parts, and may therefore be made very light compared with spring F, and consequently the proportion of the potential energy of the latter absorbed by the former may be made very small.

In all lubricant guns employing a nozzle of the contact type, as exemplified by nozzle L of Fig. 1, the lubricant when under pressure exerts a force tending to push the nozzle away from sealing engagement with the fitting, proportional to the contact area. It is therefore necessary in all guns of this type to make the area of the plunger D somewhat larger than the area of contact on the fitting M, to provide a differential pressure exerted on the forward end of the cylinder tending to urge the gun toward the fitting and thus maintain a lubricant-tight seal. This requirement imposes a limitation on guns of this type, since being manually operated the force applied to the plunger, and consequently the maximum lubricant pressure, is limited by the strength of the users. In the gun shown in Fig. 1, the same limitation as to the area of the plunger D exists, but the maximum force applied to the plunger has no particular relation to the strength of the user, and is limited only by practical considerations governing the strength of the spring F, the mass of the hammer E, and the length of its free stroke. It is readily possible in a gun of this type to obtain lubricant pressures from two to four times as great as is possible with a hand lubricant gun of the usual type of corresponding dimensions.

In Fig. 5 a modification of the gun mechanism of Fig. 1 is illustrated wherein the hammer E is slidably mounted upon a rod 21 formed integrally with the plunger D, thus distinctly separating the functions of the hammer and plunger. This construction permits the use of a check valve 23 at the inlet port of the cylinder B and of disposition of the inlet port forwardly of the cylinder, and makes possible a longer free stroke of the hammer, at the same time reducing the friction during that part of its stroke, so that it may acquire a relatively higher velocity, and consequently higher kinetic energy, prior to its impact with shoulder 22 of the plunger. The rearward end of the sleeve H may be closed by a screw plug 24 against which the rearward end of the spring F bears so that the degree of compression of the spring F at the moment of its release may be varied at will.

In operation the gun mechanism of Fig. 5 performs similarly to that of Fig. 1 with the exception that upon the release of the latch G the hammer E may travel freely under the full force of the spring F until it engages with the shoulder 22 of the plunger D, by impact, after which all of the kinetic energy of the hammer (which is expressed as one half the mass times the square of the velocity) is converted into work, expressed as force times distance. It follows that the shorter the distance in which the hammer is brought to rest, the greater the average force developed, and since it is this force which presses the plunger against the lubricant, the greater the lubricant pressure. The adjustable feature of the spring F, as represented by the screw plug 24, may obviously be incorporated in any of the various forms of the gun mechanism previously and subsequently described herein, and is desirable in order to accommodate the mechanism to the strength of the user. It should be noted, however, that when the degree of compression of the spring F is reduced by this means, the energy stored therein is also reduced, reducing by the same proportion the kinetic energy acquired by the hammer and the maximum pressure created by the gun.

In the gun shown in Fig. 5, the plunger D absorbs some of the kinetic energy of the hammer during impact, in being put in motion from its initial state of rest. In Figs. 6 and 7 another form of gun mechanism is shown wherein the mass of the plunger D is reduced by providing an internal bore 31 therein, and the mass of the hammer E is increased by taking advantage of the space within the coils of the spring F as indicated at 32. Further, the operating sleeve H is telescopically mounted within the bore 33 of a member 34 rigidly secured to the body A by cooperating screw threads 35 and forming a part of the body assembly. A mushroom head 36 may be fixed at the rearward end of the sleeve H, to fit the palm of the operator, thereby facilitating the application of manual thrust to the sleeve. As in the gun mechanism of Fig. 5, the hammer E may travel free of plunger D during the initial portion of its stroke, thus permitting efficient conversion of the potential energy of the spring into the kinetic energy of the moving mass of the hammer. Lost motion linkage between the hammer E and the plunger D for the purpose of retracting the plunger when the spring K urges the member E to its normal position and at the same time permitting the free travel of the hammer, comprises an elongated screw 37 secured to the forward end of the hammer E and having its head located within the bore 31 of the plunger and adapted to engage with a nut 38 secured to the rearward end of the plunger. The latch G may be formed of a rigid pawl 39 supported upon the outer end of a spring 40, fixed at 41 to the outer wall of the member 34 and extending through a slot 42 in the member 34, through a slot 43 in the sleeve H and into the path of the hammer E. Means J for releasing the latch G is provided for in forming the rearward end of the slot 43 with an inclined wall. A stud screw 44 fixed to the body 34 and extending within a slot 45 located longitudinally through the sleeve H may be employed to limit the travel of the sleeve H relative to the member 34.

The gun mechanism of Figs. 6 and 7 possesses greater efficiency than that of any of the preceding forms described due to the relatively small mass of plunger D and the relatively large mass of the hammer E. With this type of mechanism, the lubricant inlet to the cylinder B may be either a simple port as in Fig. 6, or a check valve as in Fig. 5.

In Figs. 9 and 10 another form of the gun mechanism is illustrated, which is similar in most respects to that shown in Figs. 6 and 7, but differs in that the sleeve H is telescopically mounted over a member 51 forming part of the body assembly, having its substantial counterpart in the member 34 of the guns of Figs. 6 and 7. The latch mechanism G may be fixed directly to the hammer E and formed of spring steel stamped in the shape illustrated so that the portion 52 of the latch may engage with the rearward end wall of the member 51 to lock the hammer against forward movement, as shown in Fig. 9. The releasing means J comprises an inwardly extending annular rib 53 formed on the inner wall of the sleeve H adjacent to its rearward end. This rib as indicated in dotted lines of Fig. 9, when moved into contact with the latch G urges the latch inwardly toward the hammer E until the latch is released from engagement with the member 51 whereupon the hammer is free to travel forwardly under the pressure of the spring F, acquiring velocity and kinetic energy, until it impacts a disc 54 secured to the rearward end of the plunger D, where its motion is arrested and its kinetic energy imparted to the plunger, driving the latter forwardly in the cylinder B. The extension of the spring F is limited by means of a tie-rod 55 secured at one end to the closed end of the sleeve H, extending longitudinally thereof and through the hammer E, and having at its other end an enlarged head 58 entering a corresponding bore in the hammer. The spring K, as in the previous forms of gun mechanism, subsequent to the power stroke of the gun as represented in Fig. 10, serves to return the hammer E to its normal position, the sleeve H, spring F and tie-rod 55 moving as a unit with the hammer E. The plunger D is retracted upon the return movement of the sleeve H through the medium of a screw 56 attached to tie-rod 55 and extending longitudinally thereof and engageable at 57 with the plunger by lost motion linkage.

In Figs. 11 and 12, a further form of gun mechanism is illustrated which departs from the structure heretofore described in that four springs are employed instead of but two, for the purpose of increasing the efficiency of the transfer of energy from the spring F to the hammer E and from the latter to the plunger D, by reducing the energy absorbed by the spring K. This end is accomplished by providing a spring Ka the whole function of which is to return the sleeve H, representing the first additional spring, and a spring Kb for the sole purpose of returning the plunger D, representing the second additional spring, thus relieving the spring K from the burden of returning the sleeve H and the plunger. This permits making the spring K relatively light so that a very small amount of the force of the spring F is absorbed by it during the accelerating movement of the hammer E. Furthermore, the plunger return spring Kb, while it must be somewhat heavier than spring K, owing to the relatively large friction of the plunger D may be considerably lighter than the spring K of Fig. 6 and other preceding figures as it does not have the additional burden of returning the sleeve H. Thus, less of the energy of the hammer is absorbed by the spring as the piston moves forward, leaving more energy available for accomplishing useful work. In other words, by the use of three separate springs one may more accurately adjust their stiffness to their duties, decreasing the energy absorbed by the springs and increasing the overall efficiency of the transfer of energy to the lubricant.

In this form of gun mechanism the forward end of the spring F bears upon an annular member 61 slidably mounted upon a rigid rod 62 centrally located and fixed to and within the sleeve H, through the medium of the head 36, the extension of the spring F being limited by means of stops 65 formed at diametrically opposite points on the sleeve H and engaging the annular member 61. The forward end of the rod 62 is free to ride within the bore 31 of the plunger D as the sleeve H is urged forwardly. The member 61, with the parts in normal position, bears directly upon the hammer E. The latch mechanism G and releasing means J may be identical to that form described in connection with Figs. 6 and 7. An externally flanged bushing 63 may be secured to the rearward end of the plunger D for engagement with the rearward end of the plunger spring Kb and to receive the impact of the hammer E. A tubular stop member 64 surrounds the spring Kb and bushing 63 for the purpose of limiting the rearward movement of plunger D and is held in place by thrust applied thereto by the forward end of the spring Ka, as shown. The spring K is located between the member 63 and the adjacent end of the hammer E.

In operation, thust upon the sleeve H will cause the spring F to become compressed, thus storing up potential energy to be later used in driving the hammer E and at the same time the manual force applied functions to compress the spring Ka, thus reserving energy for the return of the sleeve. When the sleeve H is at the end of its forward stroke the releasing means J will function to release the latch G and the hammer E will be driven forwardly at high velocity, compressing the relatively light spring K during its travel until it engages by impact with the member 63 to propel the plunger D forward, forcefully, into the cylinder B. As the plunger is urged forwardly the spring Kb will become compressed, thus storing energy therein for the return of the plunger.

Upon manual release of the sleeve H, with the parts in the position shown in Fig. 12, representing the end of the back stroke, the spring Ka will function to return the sleeve, together with the rod 62, the member 61 and the spring F, at the same time, permitting the springs K and Kb to return the hammer E and plunger D. Attention is called to the fact that the complete functioning of the spring K to return the hammer E to its normal position does not become fully effective until the spring Kb has urged the plunger B to its fully retracted position whereupon the gun mechanism is in readiness for the next succeeding cycle in its operation.

In Figs. 14 and 15, a further form of gun mechanism is illustrated wherein the spring K is wholly absent and no opposing force of any sort (except friction) acts upon the hammer E during its initial movement while gaining velocity and kinetic energy prior to its impact with the plunger D. The means for returning the hammer comprises a spring pawl 71, engageable with a shoulder 72 formed adjacent to the forward end of the hammer, and fixed to the sleeve H so that the spring Ka is called upon to draw the hammer rearwardly after each pressure stroke of the gun subsequent to the return of the plunger D by the spring Kb so as to move the hammer E to the position shown in dotted lines in Fig. 15 where the latch 71 may engage with the flange 72. In other respects this form of gun mechanism operates precisely the same as that described in Figs. 11 and 12. The advantage of this construction is a further increase of efficiency, by the elimination of the spring K and consequent reduction of the energy absorption by the system of return spring, with resulting increased overall efficiency.

In several guns illustrated and described herein all possess a common feature in that relatively high applications of pressure to lubricant within the cylinder B may be obtained, without excessive manual exertion and without any tendency to break the lubricant-tight seal between the contact nozzle and the lubricant receiving fitting, a feature which is of great importance in the lubricating art, particularly in such instances as where the passage of lubricant into the fitting M is momentarily prevented by slight obstructions in the bearing or lubricant passages of the device with which the fitting is associated, or in the presence of congealed or dried lubricant offering relatively high resistance to flow. Where high pressures are inherently demanded for the effective feeding of lubricant to the bearing a series of pressure strokes of the gun mechanism may be carried out representing a minimum application of manual force, since the function of manually compressing the spring F may take place over a relatively long period as compared with that of the full stroke of the plunger D under impact of the hammer E.

It is to be understood that the described embodiments of the invention herein set forth are presented for the purpose of illustration only, and various changes may be made therein without departing from the spirit and scope of the invention.

I claim:

1. A lubricating device comprising, a lubricant pump including a plunger, a rigid discharge member for the pump adapted for contact engagement with a lubricant receiving fitting, and kinetic energy operated means including a hammer contained in said device for operating said plunger and for simultaneously imparting a thrust to said discharge member.

2. In a lubricating device in combination, a lubricant pump including a plunger, a rigid discharge member for the pump adapted for contact engagement with a lubricant receiving fitting, a hammer, means for building up energy, and manually operated means for releasing the energy to said hammer for operating said plunger.

3. In a lubricant device in combination, a lubricant pump having a plunger, a movable mass, manually operated means forming a part of said device for imparting motion to said movable mass whereby it may acquire kinetic energy, and means for utilizing said kinetic energy to move said plunger.

4. In a lubricant device in combination, a lubricant pump having a plunger, a mass movable with respect to said plunger, means for imparting motion to said mass, and means for arresting the motion of said mass and utilizing the kinetic energy to apply thrust to said plunger.

5. In a lubricant device, in combination, a lubricant pump having a plunger, a ram, means forming a part of said device for imparting motion to said ram, and means for utilizing the kinetic energy of the moving ram to apply thrust to said plunger.

6. In a lubricant device, in combination, a lubricant pump having a plunger, a ram, means forming a part of said device for imparting motion to said ram, and means for utilizing the kinetic energy of the moving ram to move said plunger.

7. In a lubricant device in combination, a lubricant pump having a plunger, a ram having a relatively large mass as compared with said plunger, a housing, means within said housing for imparting motion to said ram, and means for utilizing the kinetic energy of the moving ram to apply thrust to said plunger.

8. A lubricant device comprising, a lubricant pump having a plunger, a power spring, means for storing energy in said spring, means for converting the potential energy stored in said spring into kinetic energy, and means for utilizing said kinetic energy to apply thrust to said plunger.

9. A lubricant device comprising, a lubricant pump having a plunger, a ram movable with respect to said plunger, means including a spring for imparting motion to said ram, and means for utilizing the kinetic energy of said ram to apply thrust to said plunger.

10. A lubricant device comprising, a lubricant pump having a plunger, a ram movable with respect to said plunger, a power spring, means for compressing said spring and storing energy therein, means for releasing said spring and utilizing the stored energy therein to impart motion to said ram, and means for utilizing the kinetic energy due to the motion of said ram to apply thrust to said plunger.

11. A lubricant device comprising, a lubricant pump having a plunger, a rigid discharge conduit, and a discharge orifice having an annular contact surface adapted to make sealing engagement with a lubricant receiving fitting, said plunger, conduit and contact surface being substantially in axial alignment, a hammer element, means for imparting motion to said hammer element and developing kinetic energy therein, and means for utilizing said kinetic energy to produce a thrust upon said plunger.

12. A lubricant device comprising, a lubricant pump having a plunger, a rigid discharge conduit, and a discharge orifice having an annular contact surface adapted to make sealing engagement with a lubricant receiving fitting and enclosing an area not greater than the effective area of said plunger, said plunger, conduit and contact surface being substantially in axial alignment, a hammer element, means for imparting motion to said hammer element and developing kinetic energy therein, and means for utilizing said kinetic energy to produce a thrust upon said plunger.

13. A lubricant device comprising, a lubricant pump having a plunger, a ram, manually operated means for imparting motion to said ram, to develop kinetic energy therein and means for utilizing the kinetic energy of the moving ram to apply thrust to said plunger.

14. In a lubricant device having a pressure cylinder and a plunger mounted for reciprocation therein, a force multiplying mechanism comprising a hammer element, means for exerting a force on said hammer element thereby putting said hammer element in motion and causing said hammer element to acquire velocity and kinetic energy, means for arresting the motion of said hammer element in a relatively shorter distance than the distance through which the force originally applied to said hammer element was exerted, thereby converting said kinetic energy into resultant force of greater intensity than the force originally applied to said hammer element, and means for applying said resultant force to said plunger.

15. In a lubricant device having a pressure cylinder and a plunger mounted for reciprocation therein, a force multiplying mechanism comprising a hammer element, a spring adapted to exert a thrust upon said hammer element, means for compressing said spring, means for locking said hammer element against movement while said spring is being compressed, means for releasing said hammer element after said spring is compressed and permitting said spring to cause said hammer element to move and acquire velocity and kinetic energy, means for arresting the motion of said hammer element in a relatively shorter distance than the distance through which said spring was originally compressed, thereby converting said kinetic energy into a resultant force of greater intensity than the force originally required to compress the spring, and means for applying said resultant force to said plunger.

16. A lubricant device comprising, a lubricant pump having a plunger, a spring for applying thrust to said plunger, manually operable means for compressing said spring, means for locking said plunger against movement, means for releasing said plunger when the spring is compressed, and means permitting said plunger to move relatively freely during the initial portion of its stroke after being released, to acquire velocity, and subsequently interposing resistance to the movement of said plunger, causing its kinetic energy to produce a thrust exerted upon the lubricant and developing pressure therein.

17. A lubricating gun comprising, a pressure cylinder, a plunger mounted for reciprocation in said cylinder, a hammer element adapted to be moved into engagement with said plunger, a power compression spring for applying thrust to said hammer element, a manually operable member mounted for movement along the axis of said spring for placing said spring under compression, means for locking said hammer element away from said plunger during the compression of said spring, means for releasing said hammer element after said spring is compressed, whereby the force of said spring is utilized to cause movement of said hammer element toward said plunger and into engagement therewith, a spring for returning said hammer element to its normal position, and linkage between said hammer element and said plunger for retracting the plunger as said hammer element is returned.

18. A lubricating gun comprising, a pressure cylinder, a plunger mounted for reciprocation in said cylinder, a hammer element adapted to be moved into engagement with said plunger, a power compression spring for applying thrust to said hammer element, a manually operable member mounted for movement along the axis of said spring for placing said spring under compression, means for locking said hammer element away from said plunger during the compression of said spring, means for releasing said hammer element when said spring is compressed whereby the force of said spring is utilized to cause movement of said hammer element toward said plunger and into engagement therewith, a spring for returning said manually operable member to its normal position, and another spring for returning said hammer element, to its normal position independently of said last named spring.

19. A lubricating gun comprising, a pressure cylinder, a plunger mounted for reciprocation in said cylinder, a hammer element adapted to be moved into engagement with said plunger, a power compression spring for applying thrust to said hammer element, a manually operable member mounted for movement along the axis of said spring for placing said spring under compression, means for locking said hammer element away from said plunger during the compression of said spring, means for releasing said hammer element when said spring is compressed, whereby the force of said spring is utilized to cause movement of said hammer element toward said plunger and into engagement therewith, a spring for returning said manually operable member to its normal position, a spring for returning said hammer element to its normal position independently of said last named spring, and another independently operable spring for retracting said plunger.

20. A lubricating gun comprising, a pressure cylinder, a plunger mounted for reciprocation in said cylinder, a hammer element adapted to be moved into engagement with said plunger, a power compression spring for applying thrust to said hammer element, a manually operable member mounted for movement along the axis of said spring for placing said spring under compression, means for locking said hammer element away from said plunger during the compression of said spring, means for releasing said hammer element when said spring is compressed whereby the force of said spring is utilized to cause movement of said hammer element toward said plunger and into engagement therewith, a spring for returning said manually operable member to its normal position, and means associated with said manually operable member for returning said hammer element therewith.

HARRY R. TEAR.